US011293542B2

(12) United States Patent
Sperlich et al.

(10) Patent No.: US 11,293,542 B2
(45) Date of Patent: Apr. 5, 2022

(54) SEALING SURFACE HAVING LEAK-PROOF PASSAGE OF AN OIL CHANNEL

(71) Applicants: ZF FRIEDRICHSHAFEN AG, Friedrichshafen (DE); ZF WIND POWER ANTWERPEN N.V., Lommel (BE)

(72) Inventors: Ralf Sperlich, Witten (DE); Dirk Strasser, Breckerfeld (DE); Joerg Muench, Wuppertal (DE)

(73) Assignees: ZF FRIEDRICHSHAFEN AG, Friedrichshafen (DE); ZF WIND POWER ANTWERPEN N.V., Lommel (BE)

( * ) Notice: Subject to any disclaimer, the term of this patent is extended or adjusted under 35 U.S.C. 154(b) by 748 days.

(21) Appl. No.: 15/999,468

(22) PCT Filed: Jan. 26, 2017

(86) PCT No.: PCT/EP2017/051612
§ 371 (c)(1),
(2) Date: Sep. 19, 2018

(87) PCT Pub. No.: WO2017/140473
PCT Pub. Date: Aug. 24, 2017

(65) Prior Publication Data
US 2021/0148452 A1    May 20, 2021

(30) Foreign Application Priority Data
Feb. 18, 2016    (DE) .................. 10 2016 202 514.7

(51) Int. Cl.
*F16H 57/04*    (2010.01)
*F16H 57/029*   (2012.01)
*F16H 57/02*    (2012.01)

(52) U.S. Cl.
CPC ....... *F16H 57/0424* (2013.01); *F16H 57/029* (2013.01); *F16H 2057/02043* (2013.01)

(58) Field of Classification Search
CPC ...... F16H 57/029; F16H 57/04; F16H 57/042; F16H 57/0424; F16H 2057/02043
See application file for complete search history.

(56) References Cited

U.S. PATENT DOCUMENTS 3,263,521 A * 8/1966 Muller .................. B23Q 1/015
                                                    74/606 R
3,763,961 A * 10/1973 Casale ...................... F16N 7/26
                                                    184/11.2
(Continued)

FOREIGN PATENT DOCUMENTS

DE        19916106 A1     10/2000
DE    102010023078 A1  *  12/2011
(Continued)

*Primary Examiner* — Adam D Rogers
(74) *Attorney, Agent, or Firm* — Leydig, Voit & Mayer, Ltd.

(57) ABSTRACT

A transmission housing includes a first housing half forming a first sealing surface and a first lubricant line, and a second housing half forming a second sealing surface and a second lubricant line. The first sealing surface and the second sealing surface seal an internal space in relation to an environment. An opening of the first lubricant line and an opening of the second lubricant line are fluidically connected to one another. The first sealing surface has a first groove and the second sealing surface has a second groove. The first groove and the second groove together form a third lubricant line. The third lubricant line runs between the opening of the first lubricant line into the first sealing surface and the environment of the transmission housing and between the opening of the second lubricant line into the second sealing surface and the environment of the transmission housing.

13 Claims, 2 Drawing Sheets

(56) References Cited

U.S. PATENT DOCUMENTS

| | | | |
|---|---|---|---|
| 9,683,651 B2 * | 6/2017 | Fukasawa | F16H 57/0494 |
| 10,550,929 B2 * | 2/2020 | Ahn | F16H 57/0424 |
| 2001/0011616 A1 | 8/2001 | Kageyama et al. | |
| 2006/0065486 A1 | 3/2006 | Matsubara et al. | |
| 2008/0164100 A1 | 7/2008 | Iraha et al. | |
| 2016/0334004 A1 | 11/2016 | Leimann | |
| 2017/0138460 A1 * | 5/2017 | Beque | F16H 57/0479 |

FOREIGN PATENT DOCUMENTS

| | | | |
|---|---|---|---|
| JP | 2005106176 A | | 4/2005 |
| JP | 2014181678 A | | 9/2014 |
| KR | 20010055624 A | | 7/2001 |
| WO | WO-2009034746 A1 | * | 3/2009 |
| WO | WO 2015106901 A1 | | 7/2015 |

* cited by examiner

SEALING SURFACE HAVING LEAK-PROOF PASSAGE OF AN OIL CHANNEL

CROSS REFERENCE TO RELATED APPLICATIONS

This application is a U.S. National Stage Application under 35 U.S.C. § 371 of International Application No. PCT/EP2017/051612 filed on Jan. 26, 2017, and claims benefit to German Patent Application No. DE 10 2016 202 514.7 filed on Feb. 18, 2016. The International Application was published in German on Aug. 24, 2017 as WO 2017/140473 A1 under PCT Article 21(2).

FIELD

The invention relates to a transmission housing, and in particular, to a transmission housing having a first housing half and a second housing half, wherein the first housing half forms a first sealing surface and the second housing half forms a second sealing surface.

BACKGROUND

From the prior art, transmission housings are known, the housing halves of which are joined by means of a screwed or sealingly designed flange connection. A first lubricant line runs through a first of the two housing halves, a second lubricant line runs through a second of the two housing halves. The first lubricant line and the second lubricant line each open into the flange connection. At this point, the first lubricant line and the second lubricant line are connected to one another in an oil-channeling manner by means of a seal. In case of a failure of this seal, there is the risk that oil leaks via the flange connection from the transmission housing.

SUMMARY

In an embodiment, the present invention provides a transmission housing. The transmission housing includes a first housing half forming a first sealing surface and a first lubricant line; and a second housing half forming a second sealing surface and a second lubricant line. The first sealing surface and the second sealing surface are configured to cooperate so as to seal an internal space in relation to an environment of the transmission housing. The first lubricant line leads into the first sealing surface and the second lubricant line leads into the second sealing surface. An opening of the first lubricant line into the first sealing surface and an opening of the second lubricant line into the second sealing surface are fluidically connected to one another. The first sealing surface has a first groove and the second sealing surface has a second groove. The first groove and the second groove together form a third lubricant line. The third lubricant line runs between the opening of the first lubricant line into the first sealing surface and the environment of the transmission housing and between the opening of the second lubricant line into the second sealing surface and the environment of the transmission housing. The third lubricant line leads into the internal space on both sides.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
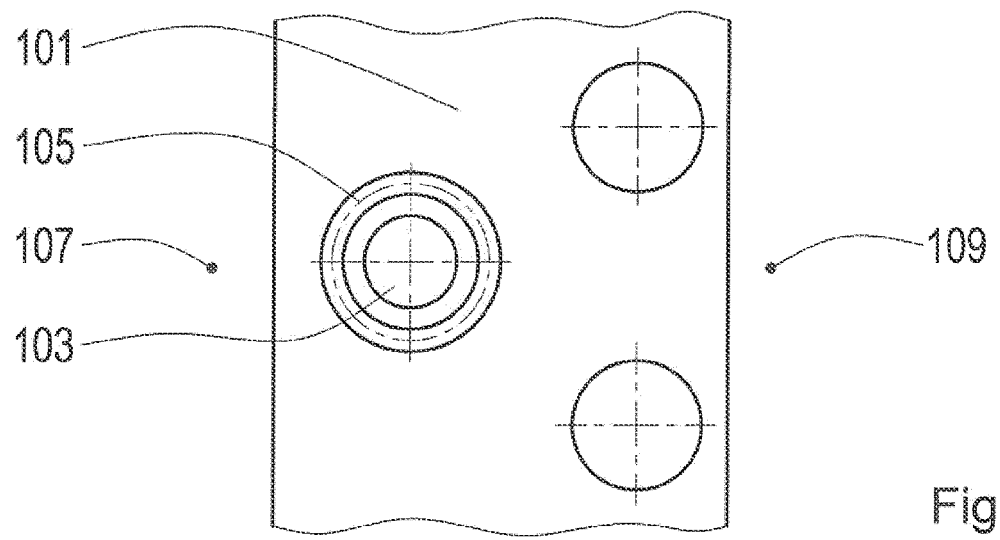
FIG. 1 shows a sealing surface with oil bore.

Embodiments of the invention address the problem of providing a transmission housing that does not have the disadvantages inherent in the solutions known from the prior art. In particular, embodiments of the invention provide transmission housings with which a risk of a leaking of lubricant is supposed to be reduced.

A transmission housing is generally used to separate an internal space or an interior of the transmission housing from an environment or an external space of the transmission housing. The transmission housing encases or encapsulates a hollow space. Said hollow space is the aforementioned internal space of the transmission housing.

Transmission housings according to embodiments of the invention include a first housing half and a second housing half. A housing half generally refers to a part of the transmission housing that is designed physically separately from further housing halves of the same transmission housing. A transmission housing with two housing halves is thus a transmission housing with at least two pieces. The housing halves can be joined with one another. In the joined state, they form the transmission housing. Thereby, each housing half forms part of the encasing or encapsulation of the internal space. Preferably, the housing halves are joined detachably with one another, for example, by screw connections.

The housing halves are sealingly joined with one another. Preferably, the internal space of the transmission housing is sealed against a passage of lubricant into the environment. For that purpose, the first housing half presently forms a first sealing surface, and the second housing half forms a second sealing surface. The first sealing surface and the second sealing surface cooperate such that they seal the internal space in relation to the environment. In particular, the sealing prevents the passage of lubricant between the two sealing surfaces. The two sealing surfaces are preferably planar sealing surfaces.

More specifically, at least one part—called the first active surface—of the first sealing surface is sealed in relation to at least one part—called the second active surface—of the second sealing surface. The first active surface and the second active surface are thus sealingly connected to one another, particularly in a fluid-tight or lubricant-tight manner. A sealant, for example, a solids sealant or a liquid sealant, can be introduced between the first active surface and the second active surface. Preferably, the two active surfaces are braced against the sealant, for example, by means of screw connections.

The first housing half forms a first lubricant line, and the second housing half forms a second lubricant line. In general, a lubricant line is a hollow space with exactly two openings for channeling a lubricant, preferably oil. The lubricant is channeled between the openings, i.e. from a first opening to a second opening of the lubricant line and/or from the second opening to the first opening.

The first lubricant line and the second lubricant line of the transmission housing are preferably pressure oil lines, i.e. lubricant lines designed to channel oil, upon which pressure is applied. The first lubricant line leads into the first sealing surface, and the second lubricant line leads into the second sealing surface. This means that one of the two openings of the first lubricant line is located in the first sealing surface. Correspondingly, one of the two openings of the second lubricant line is located in the second sealing surface. The first sealing surface surrounds the opening of the first lubricant line, and the second sealing surface surrounds the opening of the second lubricant line. In particular, an edge of the opening of the first lubricant line is located in the first sealing surface, and an edge of the opening of the second lubricant line is located in the second sealing surface. The edges of the openings are simultaneously the edges of the corresponding sealing surface.

The first sealing surface has a first groove, and the second sealing surface has a second groove. In general, a groove refers to an elongated indentation of a surface. Contrary to other indentations of the surface, the groove is characterized by a cross-section that is unchanged along the course of the groove. With regard to a position of the respective sectional plane, which is aligned orthogonally to a curve describing the course of the groove, the cross-section is invariant. Presently, an indentation of the first sealing surface forms the first groove, and an indentation of the second sealing surface forms the second groove. The indentations extend from a first terminus adjacent the internal space of the transmission housing to a second terminus adjacent the internal space of the transmission housing.

According to embodiments of the invention, the first groove and the second groove form a third lubricant line. The third lubricant line consists of the first groove and the second groove. For that purpose, the first groove and the second groove are preferably designed to be mirror-imaged and arranged opposite from one another. With regard to the third lubricant line, the first groove and the second groove are arranged offset in the transverse direction but not in the longitudinal direction. Each cross-section of the third lubricant line runs both through the first groove and the second groove.

The third lubricant line runs between the openings of the first lubricant line into the first sealing surface, and the openings of the second lubricant line runs into the second sealing surface and the environment of the transmission housing. More specifically, the third lubricant line runs between the opening of the first lubricant line into the first sealing surface and the environment of the transmission housing and between the opening of the second lubricant line into the second sealing surface and the environment of the transmission housing. Lubricant which, in case of a failure, breaks through the fluid-tight connection of the first lubricant line and the second lubricant line and flows between the first sealing surface and the second sealing surface in the direction of the environment of the transmission housing, is thus caught by the third lubricant line.

Both openings of the third lubricant line face the internal space of the transmission housing or are located in the internal space. The third lubricant line thus leads into the internal space on both sides. As a result, the lubricant caught by the third lubricant line is channeled back into the internal space and thus prevented from leaking into the environment of the transmission housing.

According to FIG. 1, a sealing surface 101 of a housing half of a transmission housing has a bore 103 which serves as a lubricant line. An O-ring 105 is provided to fluidically connect the bore 103 with a further bore.

With a sealing surface of a further housing half, the sealing surface 101 forms a pair of active surfaces in order to encapsulate an internal space 107 of the transmission in a fluid-tight manner in relation to the environment 109.

Figure 2:
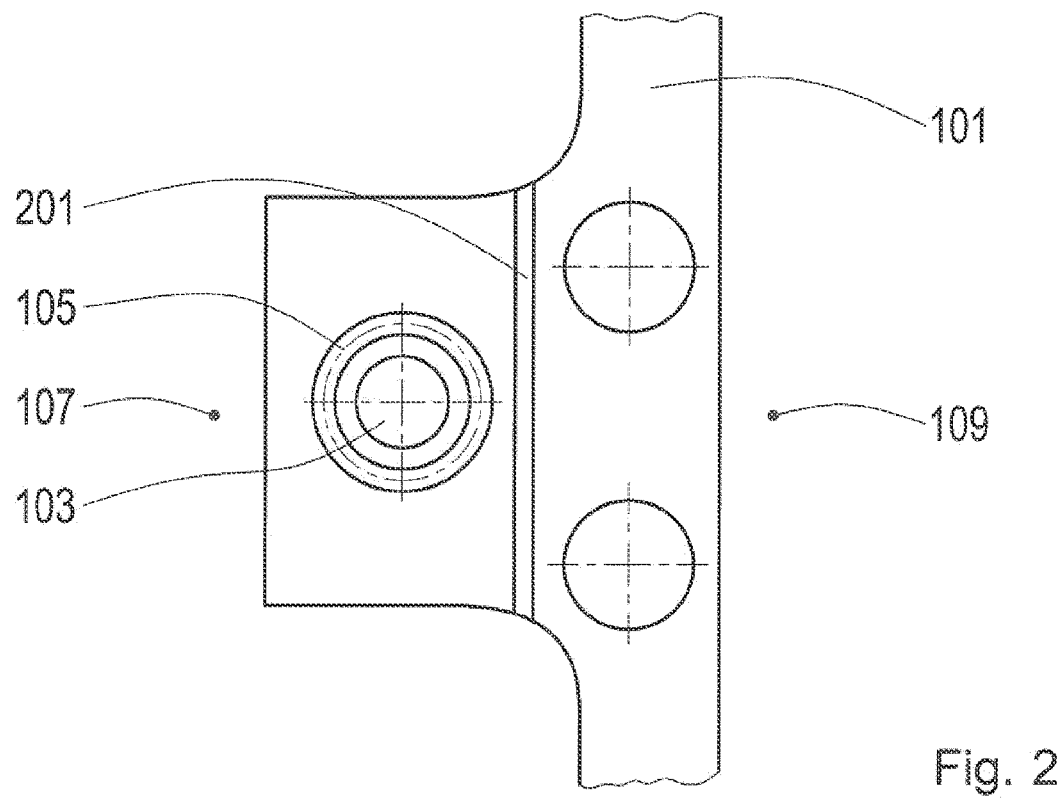
FIG. 2 shows a sealing surface with pressure relief channel.
Figure 3:
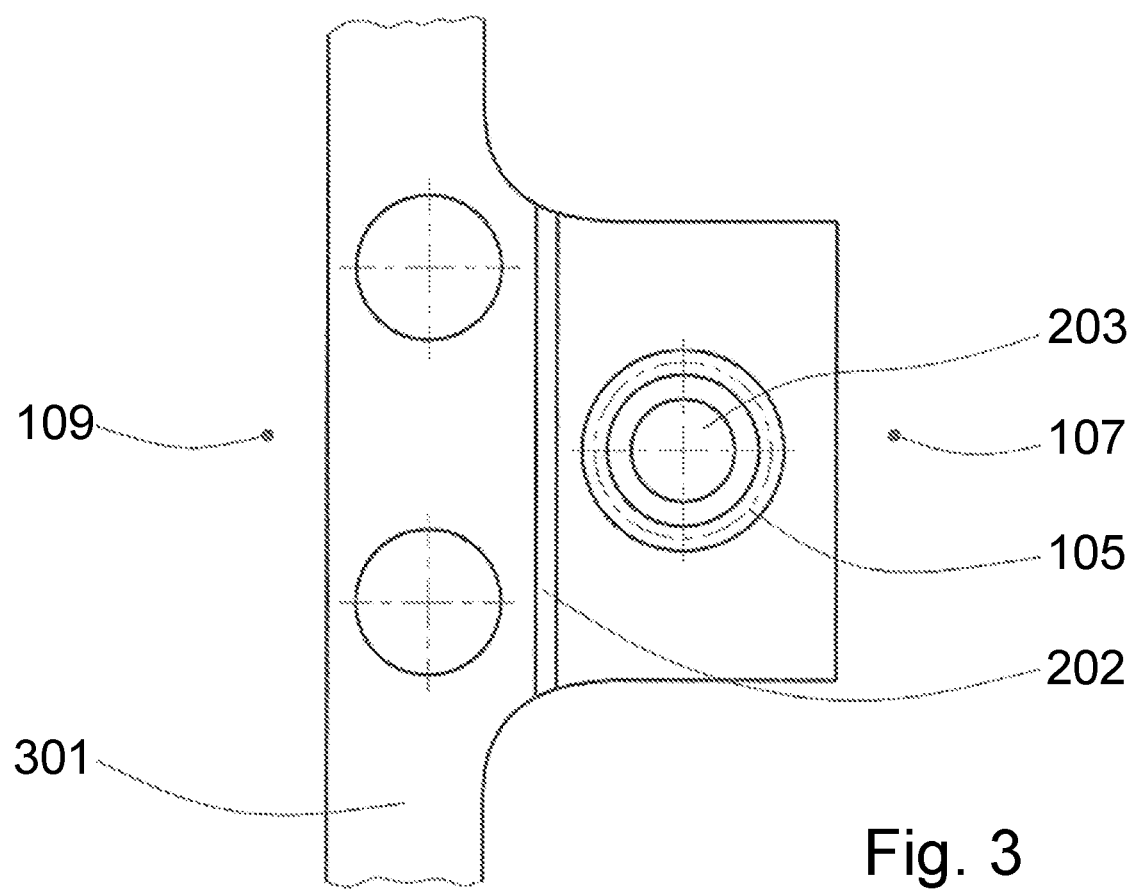
FIG. 3 shows an opposing sealing surface with pressure relief channel.

In wind power plants, oil pressures of approximately 1 to 12 bar occur. In case of a failure of the O-ring 105, there is the risk that oil leaks via the sealing surface from the bore 103 into the environment 109. This is prevented by a groove 201 shown in FIG. 2. Together with a further groove 202 of a further housing half shown in FIG. 3, the groove 201 encloses a hollow space which leads into the internal space 107 on both sides of the bore 103 and a bore 203 of the further housing half. Oil which, in case of a failure of the O-ring 105, would be able to reach the environment 109 via the sealing surface 101 and the sealing surface 301 of the further housing half, is caught by this hollow space and diverted sideways. By means of the groove 201 or the hollow space formed with the further groove 202, the oil is guided back to the internal space 107.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

101 Sealing surface
103 Bore
105 O-ring
107 Internal space
109 Environment
201 Groove

The invention claimed is:
1. A transmission housing, comprising:
a first housing half forming a first planar sealing surface and a first lubricant line, the first lubricant line being a bore extending in a first direction perpendicular to the first planar sealing surface; and
a second housing half forming a second planar sealing surface and a second lubricant line, the second lubri- cant line being a bore extending in a second direction perpendicular to the second planar sealing surface, wherein the first sealing surface and the second sealing surface are configured to cooperate so as to seal an internal space in relation to an environment of the transmission housing, a first portion of the first sealing surface and a first portion of the second sealing surface being sealingly connected to one another with lubricant therebetween;

wherein the first lubricant line leads into the first sealing surface and the second lubricant line leads into the second sealing surface;

wherein an opening of the first lubricant line into the first sealing surface and an opening of the second lubricant line into the second sealing surface are fluidically connected to one another; and wherein the first sealing surface has a first groove and the second sealing surface has a second groove;

wherein the first groove and the second groove together form a third lubricant line disposed at a distance from the first and second lubricant lines;

wherein the third lubricant line runs between the opening of the first lubricant line into the first sealing surface and the environment of the transmission housing and between the opening of the second lubricant line into the second sealing surface and the environment of the transmission housing;

wherein the third lubricant line leads into the internal space on both sides;

wherein the first portion of the first sealing surface and the first portion of the second sealing surface are configured to have a sealant introduced therebetween and are configured to be braced, by a screw connection, against one another and the sealant introduced therebetween.

2. A transmission housing, comprising:

a first housing half forming a first planar sealing surface and a first lubricant line, the first lubricant line being a bore extending in a first direction perpendicular to the first planar sealing surface; and a second housing half forming a second planar sealing surface and a second lubricant line, the second lubricant line being a bore extending in a second direction perpendicular to the second planar sealing surface, wherein the first sealing surface and the second sealing surface are configured to cooperate so as to seal an internal space in relation to an environment of the transmission housing;

wherein the first lubricant line leads into the first sealing surface and the second lubricant line leads into the second sealing surface;

wherein an opening of the first lubricant line into the first sealing surface and an opening of the second lubricant line into the second sealing surface are fluidically connected to one another; and wherein the first sealing surface has a first groove and the second sealing surface has a second groove;

wherein the first groove and the second groove together form a third lubricant line disposed at a distance from the first and second lubricant lines;

wherein the third lubricant line runs between the opening of the first lubricant line into the first sealing surface and the environment of the transmission housing and between the opening of the second lubricant line into the second sealing surface and the environment of the transmission housing;

wherein the third lubricant line leads into the internal space on both sides; and wherein an O-ring is disposed about the opening of the first lubricant line into the first sealing surface, the O-ring fluidically connecting the opening of the first lubricant line into the first sealing surface and the opening of the second lubricant line into the second sealing surface.

3. The transmission housing of claim 2, wherein the first groove is disposed at a distance, in a third direction perpendicular to first direction, from the opening of the first lubricant line into the first sealing surface.

4. The transmission housing of claim 3, wherein the first groove is formed from an indentation, extending parallel to the first direction, in the first planar sealing surface.

5. The transmission housing of claim 4, wherein the indentation extends over a length in a fourth direction perpendicular to both the first direction and the third direction.

6. The transmission housing of claim 5, wherein the indentation extends, in the fourth direction, from a first terminus adjacent the internal space to a second terminus adjacent the internal space.

7. The transmission housing of claim 3, wherein a portion of the O-ring extends, in the third direction, between the first groove and the opening of the first lubricant line into the first sealing surface.

8. The transmission housing of claim 7, wherein a first portion of the first planar sealing surface extends, in the third direction, between the portion of the O-ring and the first groove.

9. The transmission housing of claim 8, wherein a second portion of the first planar sealing surface extends, in the third direction, between the first groove and the environment of the transmission housing, and wherein the first groove separates the first portion of the first planar surface and the second portion of the first planar surface.

10. A transmission housing, comprising:

a first housing half forming a first planar sealing surface and a first lubricant line, the first lubricant line being a bore extending in a first direction perpendicular to the first planar sealing surface; and a second housing half forming a second planar sealing surface and a second lubricant line, the second lubricant line being a bore extending in a second direction perpendicular to the second planar sealing surface, wherein the first sealing surface and the second sealing surface are configured to cooperate so as to seal an internal space in relation to an environment of the transmission housing;

wherein the first lubricant line leads into the first sealing surface and the second lubricant line leads into the second sealing surface;

wherein an opening of the first lubricant line into the first sealing surface and an opening of the second lubricant line into the second sealing surface are fluidically connected to one another; and wherein the first sealing surface has a first groove and the second sealing surface has a second groove;

wherein the first groove and the second groove together form a third lubricant line disposed at a distance from the first and second lubricant lines;

wherein the third lubricant line runs between the opening of the first lubricant line into the first sealing surface and the environment of the transmission housing and between the opening of the second lubricant line into the second sealing surface and the environment of the transmission housing;

wherein the third lubricant line leads into the internal space on both sides; and wherein the first groove is disposed at a distance, in a third direction perpendicular to first direction, from the opening of the first lubricant line into the first sealing surface.

11. The transmission housing of claim 10, wherein a first portion of the first planar sealing surface extends, in the third direction, between the first groove and the opening of the first lubricant line into the first sealing surface.

12. The transmission housing of claim 11, wherein a second portion of the first planar sealing surface extends, in the third direction, between the first groove and the environment of the transmission housing, and wherein the first groove separates the first portion of the first planar surface and the second portion of the first planar surface.

13. The transmission housing of claim 10, wherein the first groove extends, in a fourth direction perpendicular to both the first direction and the third direction.

* * * * *